US 6,604,156 B1

(12) United States Patent
Slivkoff et al.

(10) Patent No.: US 6,604,156 B1
(45) Date of Patent: *Aug. 5, 2003

(54) MESSAGE BUFFER FULL HANDLING IN A CAN DEVICE THAT EMPLOYS RECONFIGURABLE MESSAGE BUFFERS

(75) Inventors: William J. Slivkoff, San Jose, CA (US); Neil Edward Birns, Cupertino, CA (US)

(73) Assignee: Koninklijke Philips Electronics N.V., Einhoven (NL)

( * ) Notice: Subject to any disclaimer, the term of this patent is extended or adjusted under 35 U.S.C. 154(b) by 376 days.

This patent is subject to a terminal disclaimer.

(21) Appl. No.: 09/630,289

(22) Filed: Aug. 1, 2000

Related U.S. Application Data

(60) Provisional application No. 60/154,022, filed on Sep. 15, 1999.

(51) Int. Cl.$^7$ ............................................. G06F 13/14
(52) U.S. Cl. .................. 710/57; 710/116; 710/240; 365/244; 365/230.8; 700/19; 700/55
(58) Field of Search ................... 710/57, 116, 240; 365/244, 230.8; 700/19, 55

(56) References Cited

U.S. PATENT DOCUMENTS

| | | | |
|---|---|---|---|
| 5,233,688 A | 8/1993 | Too | 395/161 |
| 5,349,683 A | 9/1994 | Wu et al. | 395/800 |
| 5,493,451 A | 2/1996 | Cosey, Sr. | 359/817 |
| 5,511,214 A | 4/1996 | Yamada | 395/800 |
| 5,598,578 A | 1/1997 | Hatta | 395/835 |
| 5,617,118 A | 4/1997 | Thompson | 345/200 |
| 5,854,454 A | * 12/1998 | Upender et al. | 187/247 |
| 6,216,172 B1 | * 4/2001 | Kolblin et al. | 709/253 |
| 6,363,083 B1 | * 3/2002 | Spielbauer et al. | 370/470 |

* cited by examiner

Primary Examiner—Abdelmoniem Elamin

(57) ABSTRACT

A CAN microcontroller that supports a plurality of message objects, and that includes a processor core that runs CAN applications, a plurality of message buffers associated with respective ones of the message objects, a CAN/CAL module that processes incoming messages that include a plurality of frames, each frame having a maximum number n of data bytes, and a plurality of message object registers associated with each of the message objects, including at least one buffer size register that contains a message buffer size value that specifies the size of the message buffer associated with that message object, and at least one buffer location register that contains an address pointer that points to an address of the storage location in the message buffer associated with that message object where the next data byte of the current incoming message is to be stored. The CAN/CAL module includes a message handling function that transfers successive frames of the current incoming message to the message buffer associated with a selected one of the message objects designated as a receive message object for the current incoming message, a frame status detection function that detects whether or not the current frame of the current incoming message is the final frame of the current incoming message, and a buffer-full detection function. The buffer-full detection function, in response to a detection that the current frame of the current incoming message is not the final frame of the current incoming message, determines the number of available bytes of remaining storage capacity in the message buffer associated with the designated receive message object for the current incoming message, and declares a message buffer-full condition if the determined number of available bytes is less than the maximum number n of data bytes. The CAN/CAL module further includes a message buffer-full interrupt generator function that generates a message buffer-full interrupt to the processor core in response to a declaration of a message buffer-full condition.

21 Claims, 7 Drawing Sheets

MMRs

| MMR name | R/W? | Reset | Access | Address Offset | Description |
|---|---|---|---|---|---|
| Message Object Registers (n = 0 - 31) | | | | | |
| MnMIDH | R/W | x....x00b | Word only | $000n_4n_3n_2n_1n_00000b$ (n0h) | Message n Match ID High |
| MnMIDL | R/W | xxxxh | Word only | $000n_4n_3n_2n_1n_00010b$ (n2h) | Message n Match ID Low |
| MnMSKH | R/W | x....x000b | Word only | $000n_4n_3n_2n_1n_00100b$ (n4h) | Message n Mask High |
| MnMSKL | R/W | xxxxh | Word only | $000n_4n_3n_2n_1n_00110b$ (n6h) | Message n Mask Low |
| MnCTL | R/W | 00000xxxb | Byte/Word | $000n_4n_3n_2n_1n_01000b$ (n8h) | Message n Control |
| MnBLR | R/W | xxxxh | Word only | $000n_4n_3n_2n_1n_01010b$ (nAh) | Message n Buffer Location |
| MnBSZ | R/W | 00000xxxb | Byte/Word | $000n_4n_3n_2n_1n_01100b$ (nCh) | Message n Buffer Size |
| MnFCR | R/W | 00xxxxxxb | Byte/Word | $000n_4n_3n_2n_1n_01110b$ (nEh) | Message n Fragmentation Count |
| CIC Registers | | | | | |
| MCPLL | R/C | 0000h | Byte/Word | 224h | Message Complete Low |
| MCPLH | R/C | 0000h | Byte/Word | 226h | Message Complete High |
| CANINTFLG | R/C | 0000h | Byte/Word | 228h | CAN Interrupt Flag Register |
| MCIR | RO | 0000h | Byte/Word | 229h | Message Complete Info Reg. |
| MEIR | RO | 0000h | Byte/Word | 22Ah | Message Error Info Register |
| FESTR | R/C | 0000h | Byte/Word | 22Ch | Frame Error Status Register |
| FEENR | R/W | 0000h | Byte/Word | 22Eh | Frame Error Enable Register |
| SCP/SPI Registers | | | | | |
| SPICFG | R/W | 0000h | Byte/Word | 260h | SCP/SPI Configuration |
| SPIDATA | R/W | 00h | Byte/Word | 262h | SCP/SPI Data |
| SPICS | R/W | 00h | Byte/Word | 263h | SCP/SPI Control and Status |
| CCB Registers | | | | | |
| CANCMR | R/W | 01h | Byte/Word | 270h | CAN Command Register |
| CANSTR | R/O | 00h | Byte/Word | 271h | CAN Status Register |
| CANBTR | R/W | 00h | Byte/Word | 272h | CAN Bus Timing Reg. (low) |
| - | R/W | 00h | Byte/Word | 273h | CAN Bus Timing Reg. (high) |
| TXERC | R/W* | 00h | Byte/Word | 274h | Tx Error Counter |
| RXERC | R/W* | 00h | Byte/Word | 275h | Rx Error Counter |
| EWLR | R/W | 96h | Byte/Word | 276h | Error Warning Limit Register |
| ECCR | RO | 0000h | Byte/Word | 278h | Error Code Capture Register |
| ALCR | RO | 0000h | Byte/Word | 27Ah | Arbitration Lost Capture Reg. |
| RTXDTM | WO | 0000h | Byte/Word | 27Ch | RTX Data Test Mode |
| GCTL | R/W | 0000h | Byte/Word | 27Eh | Global Control Byte |
| MIF Registers | | | | | |
| XRAMB | R/W | FEh | Byte/Word | 290h | XRAM Base Address |
| MBXSR | R/W | FFh | Byte/Word | 291h | Msg. Buff./XRAM Seg. Reg. |
| MIFBTRL | R/W | EFh | Byte/Word | 292h | MIF Bus Timing Reg. Low |
| MIFBTRH | R/W | FFh | Byte/Word | 293h | MIF Bus Timing Reg. High |

Legend: R/W = Read & Write, RO = Read Only, WO = Write Only, R/C = Read & Clear, W* = Writable only during CAN Reset mode, x = undefined after reset.

FIG. 4

Object n Match ID Field (MnMIDH and MnMIDL)

| Mid28 – Mid18 | Mid17 – Mid10 | Mid9 – Mid2 | Mid1 | Mid0 | MIDE |
|---|---|---|---|---|---|

Object n Mask Field (MnMSKH and MnMSKL)

| Msk28 – Msk18 | Msk17 – Msk10 | Msk9 – Msk2 | Msk1 | Msk0 |
|---|---|---|---|---|

Screener ID Field (assembled from incoming bit-stream)

| CAN ID.28 – CAN ID.18 | Data Byte 1 [7:0] | Data Byte 2 [7:0] | x | x | IDE |
|---|---|---|---|---|---|

FIG. 9

Object n Match ID Field (MnMIDH and MnMIDL)

| Mid28 – Mid18 | Mid17 – Mid10 | Mid9 – Mid2 | Mid1 | Mid0 | MIDE |
|---|---|---|---|---|---|

Object n Mask Field (MnMSKH and MnMSKL)

| Msk28 – Msk18 | Msk17 – Msk10 | Msk9 – Msk2 | Msk1 | Msk0 |
|---|---|---|---|---|

Screener ID Field (assembled from incoming bit-stream)

| CAN ID.28 – CAN ID.0 | IDE |
|---|---|

FIG. 10

MESSAGE BUFFER FULL HANDLING IN A CAN DEVICE THAT EMPLOYS RECONFIGURABLE MESSAGE BUFFERS

This application claims the full benefit and priority of U.S. Provisional Application Ser. No. 60/154,022, filed on Sep. 15, 1999, the disclosure of which is fully incorporated herein for all purposes.

BACKGROUND OF THE INVENTION

The present invention relates generally to the field of data communications, and more particularly, to the field of serial communications bus controllers and microcontrollers that incorporate the same.

CAN (Control Area Network) is an industry-standard, two-wire serial communications bus that is widely used in automotive and industrial control applications, as well as in medical devices, avionics, office automation equipment, consumer appliances, and many other products and applications. CAN controllers are currently available either as stand-alone devices adapted to interface with a microcontroller or as circuitry integrated into or modules embedded in a microcontroller chip. Since 1986, CAN users (software programmers) have developed numerous high-level CAN Application Layers (CALs) which extend the capabilities of the CAN while employing the CAN physical layer and the CAN frame format, and adhering to the CAN specification. CALs have heretofore been implemented primarily in software, with very little hardware CAL support. Consequently, CALs have heretofore required a great deal of host CPU intervention, thereby increasing the processing overhead and diminishing the performance of the host CPU.

Thus, there is a need in the art for a CAN hardware implementation of CAL functions normally implemented in software in order to offload these tasks from the host CPU to the CAN hardware, thereby enabling a great savings in host CPU processing resources and a commensurate improvement in host CPU performance. One of the most demanding and CPU resource-intensive CAL functions is message management, which entails the handling, storage, and processing of incoming CAL/CAN messages received over the CAN serial communications bus and/or outgoing CAL/CAN messages transmitted over the CAN serial communications bus. CAL protocols, such as DeviceNet, CANopen, and OSEK, deliver long messages distributed over many CAN frames, which methodology is sometimes referred to as "fragmented" or "segmented" messaging. The process of assembling such fragmented, multi-frame messages has heretofore required a great deal of host CPU intervention. In particular, CAL software running on the host CPU actively monitors and manages the buffering and processing of the message data, in order to facilitate the assembly of the message fragments or segments into complete messages.

Based on the above and foregoing, it can be appreciated that there presently exists a need in the art for a hardware implementation of CAL functions normally implemented in software in order to offload these tasks from the host CPU, thereby enabling a great savings in host CPU processing resources and a commensurate improvement in host CPU performance.

The assignee of the present invention has recently developed a new microcontroller product, designated "XA-C3", that fulfills this need in the art. The XA-C3 is the newest member of the Philips XA (eXtended Architecture) family of high performance 16-bit single-chip microcontrollers. It is believed that the XA-C3 is the first chip that features hardware CAL support.

The XA-C3 is a CMOS 16-bit CAL/CAN 2.0B microcontroller that incorporates a number of different inventions, including the present invention. These inventions include novel techniques and hardware for filtering, buffering, handling, and processing CAL/CAN messages, including the automatic assembly of multi-frame fragmented messages with minimal CPU intervention, as well as for managing the storage and retrieval of the message data, and the memory resources utilized therefor. In particular, the XA-C3 CAN module has the unique ability to track and reassemble the packets constituting a fragmented message, completely in hardware, only interrupting the CPU (processor core) once a complete, multi-frame message is received and assembled. This tremendously reduces the processor bandwidth required for message handling, thereby significantly increasing available bandwidth for other tasks, so that system performance is greatly enhanced.

The present invention relates to a scheme employed by the XA-C3 microcontroller to handle a message buffer full condition in such a manner that ensures no loss of data, while minimizing the required processor intervention.

SUMMARY OF THE INVENTION

The present invention encompasses a CAN microcontroller that supports a plurality of message objects, and that includes a processor core that runs CAN applications, a plurality of message buffers associated with respective ones of the message objects, a CAN/CAL module that processes incoming messages that include a plurality of frames, each frame having a maximum number n of data bytes, and a plurality of message object registers associated with each of the message objects, including at least one buffer size register that contains a message buffer size value that specifies the size of the message buffer associated with that message object, and at least one buffer location register that contains an address pointer that points to an address of the storage location in the message buffer associated with that message object where the next data byte of the current incoming message is to be stored.

The CAN/CAL module includes a message handling function that transfers successive frames of the current incoming message to the message buffer associated with a selected one of the message objects designated as a receive message object for the current incoming message, a frame status detection function that detects whether or not the current frame of the current incoming message is the final frame of the current incoming message, and a buffer-full detection function. The buffer-full detection function, in response to a detection that the current frame of the current incoming message is not the final frame of the current incoming message, determines the number of available bytes of remaining storage capacity in the message buffer associated with the designated receive message object for the current incoming message, and declares a message buffer-full condition if the determined number of available bytes is less than the maximum number n of data bytes.

The CAN/CAL module further includes a message buffer-full interrupt generator function that generates a message buffer-full interrupt to the processor core in response to a declaration of a message buffer-full condition.

In a presently preferred embodiment, the buffer-full detection function determines the number of available bytes of remaining storage capacity in the message buffer associated with the designated receive message object for the current incoming message by subtracting prescribed bits of the address pointer contained in the at least one buffer location register associated with the designated receive message object for the current incoming message, from the message buffer size value contained in the at least one buffer size register associated with the designated receive message object for the current incoming message. Additionally, in the presently preferred embodiment, the frame status detection function detects whether the current frame of the current incoming message is the final frame of the current incoming message by deriving that information from the header portion of the current frame of the current incoming message.

In the presently preferred embodiment, the CAN/CAL module further includes a message-complete interrupt generator function that generates a message-complete interrupt to the processor core in response to the frame status detection function detecting that the current frame of the current incoming message is the final frame of the current incoming message. Additionally, in the presently preferred embodiment, the CAN/CAL module further includes an address pointer increment function that, in response to a transfer of the current data byte to the message buffer associated with the designated receive message object for the current incoming message, automatically increments the address pointer to the address of the storage location in that message buffer where the next data byte of the current incoming message is to be stored.

Preferably, the size of each message buffer can be selected by the user by programming a selected message buffer size value into the at least one message buffer size register associated with that message buffer, and the base address of each message buffer can be selected by the user by programming the address pointer associated with that message buffer to point to a selected base address.

In the presently preferred embodiment, the CAN/CAL module further includes a buffer-full handling function that, in response to a declaration of a message buffer-full condition, determines a current byte count that indicates the number of data bytes of the current incoming message that have already been stored in the message buffer associated with the designated receive message object at the time the message buffer-full condition is declared, resets the address pointer contained in the at least one buffer location register associated with the designated receive message object to the base address, writes the current byte count into the message buffer associated with the designated receive message object, in the storage location corresponding to the base address, and generates a message buffer-full interrupt.

Preferably the current CAN application running on the processor core is provided with two options as to how to respond to the message buffer-full interrupt. Under the first option, in response to the message buffer-full interrupt, the current CAN application reads the entire contents of the designated receive message buffer, and then transfers the read-out entire contents to another storage location in the data memory space, thereby freeing up the designated receive message buffer to store the at least one remaining frame of the current incoming message. Under the second option, the current CAN application, in response to the message buffer-full interrupt, modifies the base address of the designated receive message buffer by replacing the current base address with a new base address, whereby the designated receive message buffer consists of a first buffer portion starting with the current base address, and a second buffer portion starting with the new base address.

Preferably, the current CAN application, in response to the message-complete interrupt, retrieves a first number of the data bytes of the current incoming message from the first buffer portion, and retrieves a second number of the data bytes of the current incoming message from the second buffer portion, where the first number is the current byte count.

BRIEF DESCRIPTION OF THE DRAWINGS

These and various other aspects, features, and advantages of the present invention will be readily understood with reference to the following detailed description of the invention read in conjunction with the accompanying drawings, in which:

FIG. 4 is a table listing all of the Memory Mapped Registers (MMRs) provided by the XA-C3 microcontroller;

FIG. 9 is a diagram illustrating the Screener ID Field for a Standard CAN Frame;

FIG. 10 is a diagram illustrating the Screener ID Field for an Extended CAN Frame;

DETAILED DESCRIPTION OF THE PREFERRED EMBODIMENT

The present invention is described below in the context of a particular implementation thereof, i.e., in the context of the XA-C3 microcontroller manufactured by Philips Semiconductors. Of course, it should be clearly understood that the present invention is not limited to this particular implementation, as any one or more of the various aspects and features of the present invention disclosed herein can be utilized either individually or any combination thereof, and in any desired application, e.g., in a stand-alone CAN controller device or as part of any other microcontroller or system.

Figure 1:
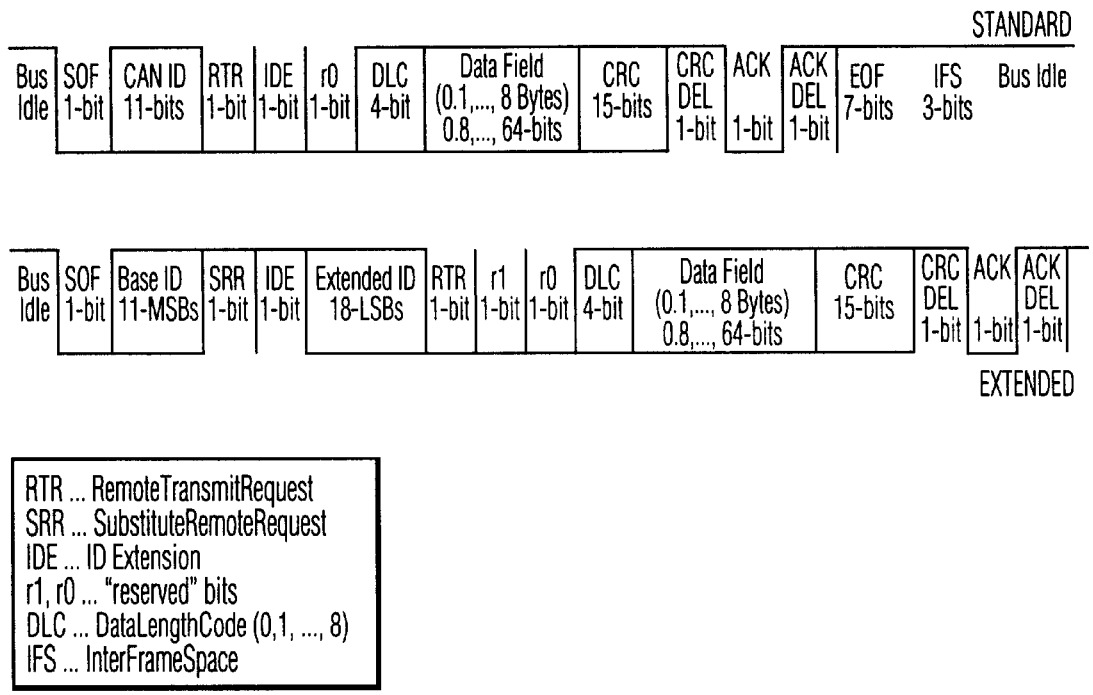
FIG. 1 is a diagram illustrating the format of a Standard CAN Frame and the format of an Extended CAN Frame.

The following terms used herein in the context of describing the preferred embodiment of the present invention (i.e., the XA-C3 microcontroller) are defined as follows:

Standard CAN Frame: The format of a Standard CAN Frame is depicted in FIG. 1.

Extended CAN Frame: The format of an Extended CAN Frame is also depicted in FIG. 1.

Acceptance Filtering: The process a CAN device implements in order to determine if a CAN frame should be accepted or ignored and, if accepted, to store that frame in a pre-assigned Message Object.

Message Object: A Receive RAM buffer of pre-specified size (up to 256 bytes for CAL messages) and associated with a particular Acceptance Filter or, a Transmit RAM buffer which the User preloads with all necessary data to transmit a complete CAN Data Frame. A Message Object can be considered to be a communication channel over which a complete message, or a succession of messages, can be transmitted.

CAN Arbitration ID: An 11-bit (Standard CAN 2.0 Frame) or 29-bit (Extended CAN 2.0B Frame) identifier field placed in the CAN Frame Header. This ID field is used to arbitrate Frame access to the CAN bus. Also used in Acceptance Filtering for CAN Frame reception and Transmit Pre-Arbitration.

Screener ID: A 30-bit field extracted from the incoming message which is then used in Acceptance Filtering. The Screener ID includes the CAN Arbitration ID and the IDE bit, and can include up to 2 Data Bytes. These 30 extracted bits are the information qualified by Acceptance Filtering.

Match ID: A 30-bit field pre-specified by the user to which the incoming Screener ID is compared. Individual Match IDs for each of 32 Message Objects are programmed by the user into designated Memory Mapped Registers (MMRs).

Mask: A 29-bit field pre-specified by the user which can override (Mask) a Match ID comparison at any particular bit (or, combination of bits) in an Acceptance Filter. Individual Masks, one for each Message Object, are programmed by the user in designated MMRs. Individual Mask patterns assure that single Receive Objects can Screen for multiple acknowledged CAL/CAN Frames and thus minimize the number of Receive Objects that must be dedicated to such lower priority Frames. This ability to Mask individual Message Objects is an important new CAL feature.

Figure 2:
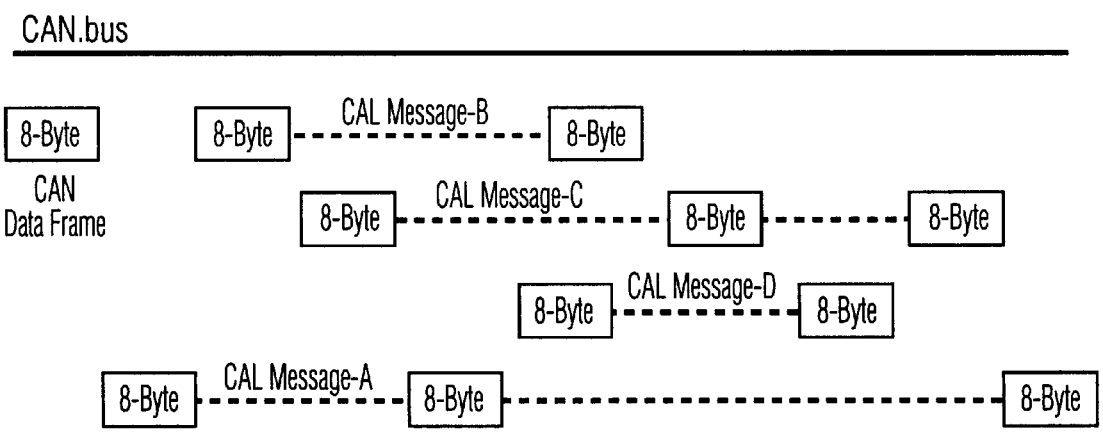
FIG. 2 is a diagram illustrating the interleaving of CAN Data Frames of different, unrelated messages.

CAL: CAN Application Layer. A generic term for any high-level protocol which extends the capabilities of CAN while employing the CAN physical layer and the CAN frame format, and which adheres to the CAN specification. Among other things, CALs permit transmission of Messages which exceed the 8 byte data limit inherent to CAN Frames. This is accomplished by dividing each message into multiple packets, with each packet being transmitted as a single CAN Frame consisting of a maximum of 8 data bytes. Such messages are commonly referred to as "segmented" or "fragmented" messages. The individual CAN Frames constituting a complete fragmented message are not typically transmitted in a contiguous fashion, but rather, the individual CAN Frames of different, unrelated messages are interleaved on the CAN bus, as is illustrated in FIG. 2

Fragmented Message: A lengthy message (in excess of 8 bytes) divided into data packets and transmitted using a sequence of individual CAN Frames. The specific ways that sequences of CAN Frames construct these lengthy messages is defined within the context of a specific CAL. The XA-C3 microcontroller automatically re-assembles these packets into the original, lengthy message in hardware and reports (via an interrupt) when the completed (re-assembled) message is available as an associated Receive Message Object.

Message Buffer: A block of locations in XA Data memory where incoming (received) messages are stored or where outgoing (transmit) messages are staged.

MMR: Memory Mapped Register. An on-chip command/ control/status register whose address is mapped into XA Data memory space and is accessed as Data memory by the XA processor. With the XAC3 microcontroller, a set of eight dedicated MMRs are associated with each Message Object. Additionally, there are several MMRs whose bits control global parameters that apply to all Message Objects.

Figure 3:
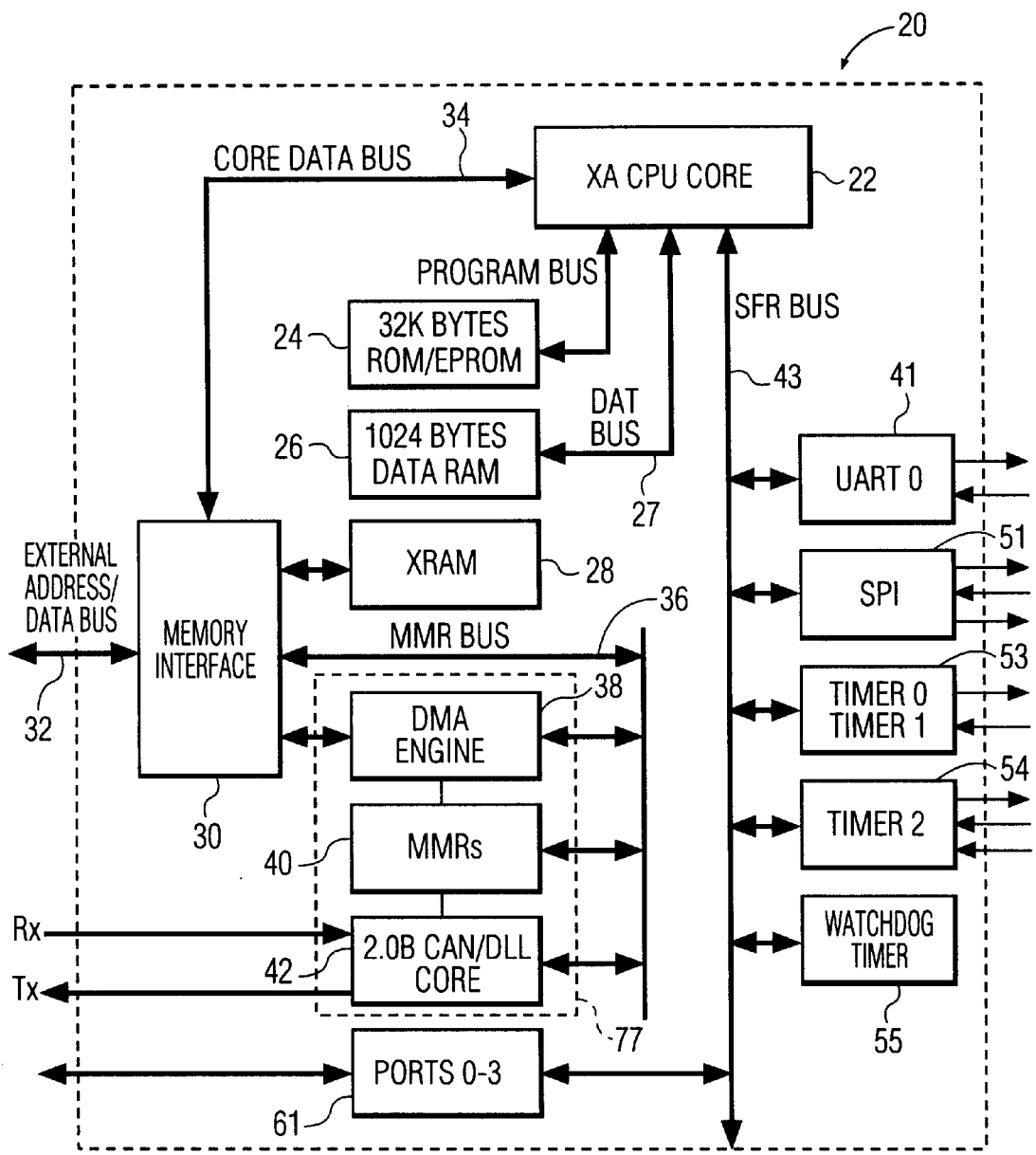
FIG. 3 is a high-level, functional block diagram of the XA-C3 microcontroller.

With reference now to FIG. 3, there can be seen a high-level block diagram of the XA-C3 microcontroller 20. The XA-C3 microcontroller 20 includes the following functional blocks that are fabricated on a single integrated circuit (IC) chip packaged in a 44-pin PLCC or a 44-pin LQFP package:

an XA CPU Core 22, that is currently implemented as a 16-bit fully static CPU with 24-bit program and data address range, that is upwardly compatible with the 80C51 architecture, and that has an operating frequency of up to 30 MHz;

program or code memory 24 that is currently implemented as a 32K ROM/EPROM, and that is bi-directionally coupled to the XA CPU Core 22 via an internal Program bus 25. A map of the code memory space is depicted in FIG. 4;

a Data RAM 26 (internal or scratch pad data memory) that is currently implemented as a 1024 Byte portion of the overall XA-C3 data memory space, and that is bi-directionally coupled to the XA CPU Core 22 via an internal DATA bus 27;

an on-chip message buffer RAM or XRAM 28 that is currently implemented as a 512 Byte portion of the overall XA-C3 data memory space which may contain part or all of the CAN/CAL (Transmit & Receive Object) message buffers;

a Memory Interface (MIF) unit 30 that provides interfaces to generic memory devices such as SRAM, DRAM, flash, ROM, and EPROM memory devices via an external address/data bus 32, via an internal Core Data bus 34, and via an internal MMR bus 36;

a DMA engine 38 that provides 32 CAL DMA Channels;

a plurality of on-chip Memory Mapped Registers (MMRs) 40 that are mapped to the overall XA-C3 data memory space—a 4K Byte portion of the overall XA-C3 data memory space is reserved for MMRs. These MMRs include 32 (Message) Object or Address Pointers and 32 ID Screeners or Match IDs, corresponding to the 32 CAL Message Objects. A complete listing of all MMRs is provided in the Table depicted in FIG. 5;

a 2.0B CAN/DLL Core 42 that is the CAN Controller Core from the Philips SJA1000 CAN (2.0A/B) Data Link Layer (CDLL) device (hereinafter referred to as the "CAN Core Block" (CCB)); and, an array of standard microcontroller peripherals that are bi-directionally coupled to the XA CPU Core 22 via a Special Function Register (SFR) bus 43. These standard microcontroller peripherals include Universal Asynchronous Receiver Transmitter (UART) 49, an SPI serial interface (port) 51, three standard timers/ counters with toggle output capability, namely, Timer 0 & Timer 1 included in Timer block 53, and Timer 2 included in Timer block 54, a Watchdog Timer 55, and four 8-bit I/O ports, namely, Ports 0–3 included in block 61, each of which has 4 programmable output configurations.

The DMA engine 38, the MMRs 40, and the CCB 42 can collectively be considered to constitute a CAN/CAL module 77, and will be referred to as such at various times throughout the following description. Further, the particular logic elements within the CAN/CAL module 77 that perform "message management" and "message handling" functions will sometimes be referred to as the "message management engine" and the "message handler", respectively, at various times throughout the following description. Other nomenclature will be defined as it introduced throughout the following description.

As previously mentioned, the XA-C3 microcontroller 20 automatically implements, in hardware, many message management and other functions that were previously only implemented in software running on the host CPU (or not implemented at all), including transparent, automatic re-assembly of up to 32 concurrent, interleaved, multi-frame, fragmented CAL messages. For each application that is installed to run on the host CPU (i.e., the XA CPU Core 22), the user (software programmer) must set-up the hardware for performing these functions by programming certain ones of the MMRs and SFRs in the manner set forth in the XA-C3 Functional Specification and XA-C3 CAN Transport Layer Controller User Manual. The register programming procedures that are most relevant to an understanding of the present invention are described below, followed by a description of the various message management and other functions that are automatically performed by the CAL/CAN module 77 during operation of the XA-C3 microcontroller 20 after it has been properly set-up by the user. Following these sections, a more detailed description of the particular invention to which this application is directed is provided.

Set-up/Programming Procedures

Figure 5:
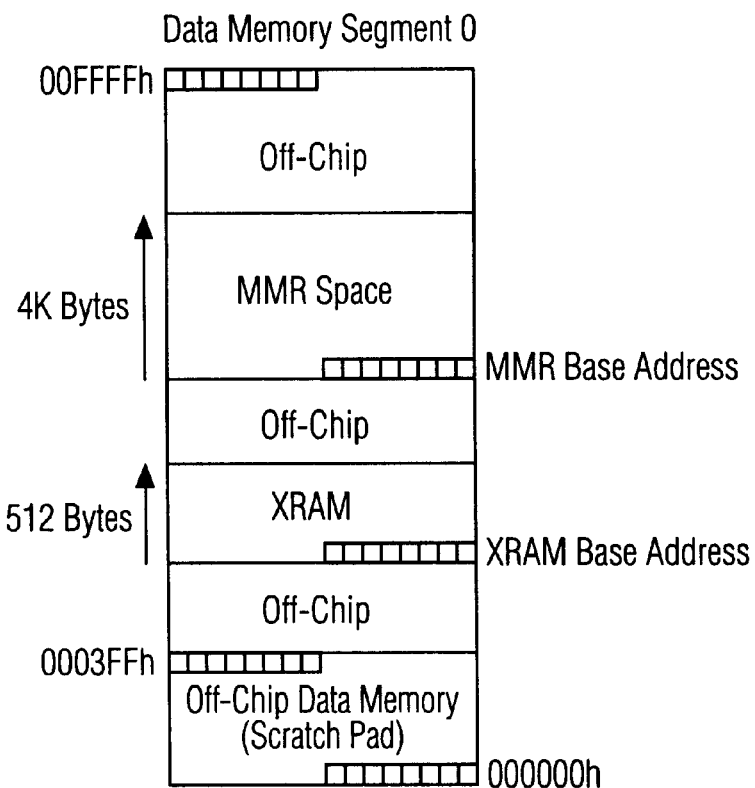
FIG. 5 is a diagram illustrating the mapping of the overall data memory space of the XA-C3 microcontroller.

As an initial matter, the user must map the overall XA-C3 data memory space, as illustrated in FIG. 5. In particular, subject to certain constraints, the user must specify the starting or base address of the XRAM 28 and the starting or base address of the MMRs 40. The base address of the MMRs 40 can be specified by appropriately programming Special Function Registers (SFRs) MRBL and MRBH. The base address of the XRAM 28 can be specified by appropriately programming the MMRs designated MBXSR and XRAMB (see FIG. 4).

Figure 6:
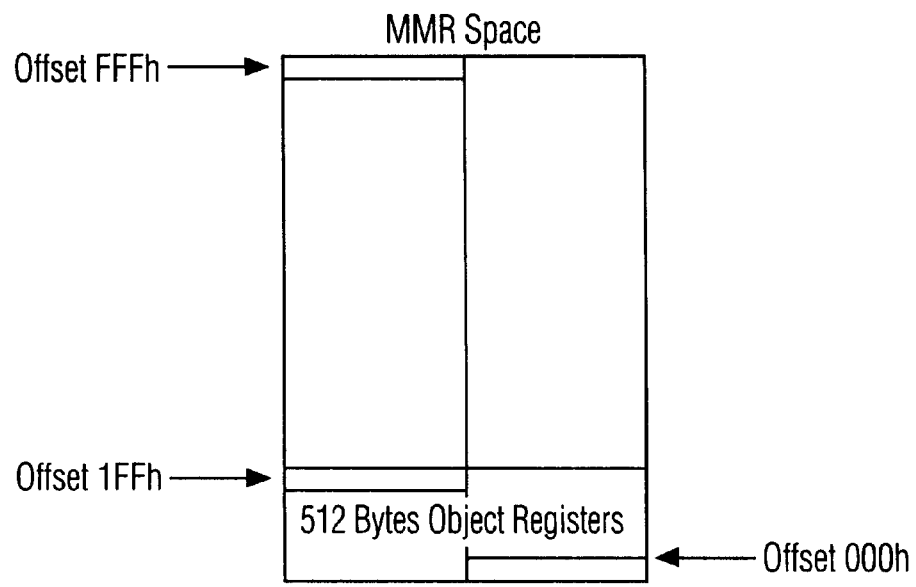
FIG. 6 is a diagram illustrating the MMR space contained within the overall data memory space of the XA-C3 microcontroller.

The user can place the 4 KByte space reserved for MMRs 40 anywhere within the entire 16 Mbyte data memory space supported by the XA architecture, other than at the very bottom of the memory space (i.e., the first 1 KByte portion, starting address of 000000h), where it would conflict with the on-chip Data RAM 26 that serves as the internal or scratch-pad memory. The 4 KBytes of MMR space will always start at a 4 K boundary. The reset values for MRBH and MRBL are 0Fh and F0h, respectively. Therefore, after a reset, the MMR space is mapped to the uppermost 4 K Bytes of Data Segment 0Fh, but access to the MMRs 40 is disabled. The first 512 Bytes (offset 000h–1FFh) of MMR space are the Message Object Registers (eight per Message Object) for objects n=0–31, as is shown in FIG. 6.

Figure 7:
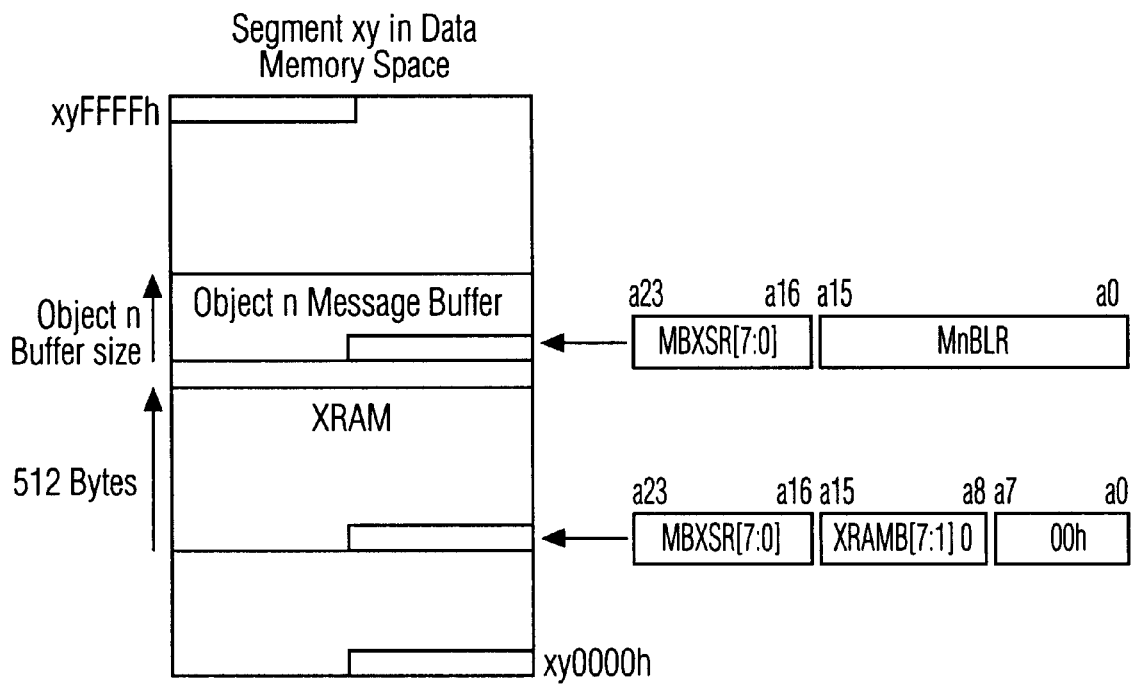
FIG. 7 is a diagram illustrating formation of the base address of the on-chip XRAM of the XA-C3 microcontroller, with an object n message buffer mapped into off-chip data memory.
Figure 8:
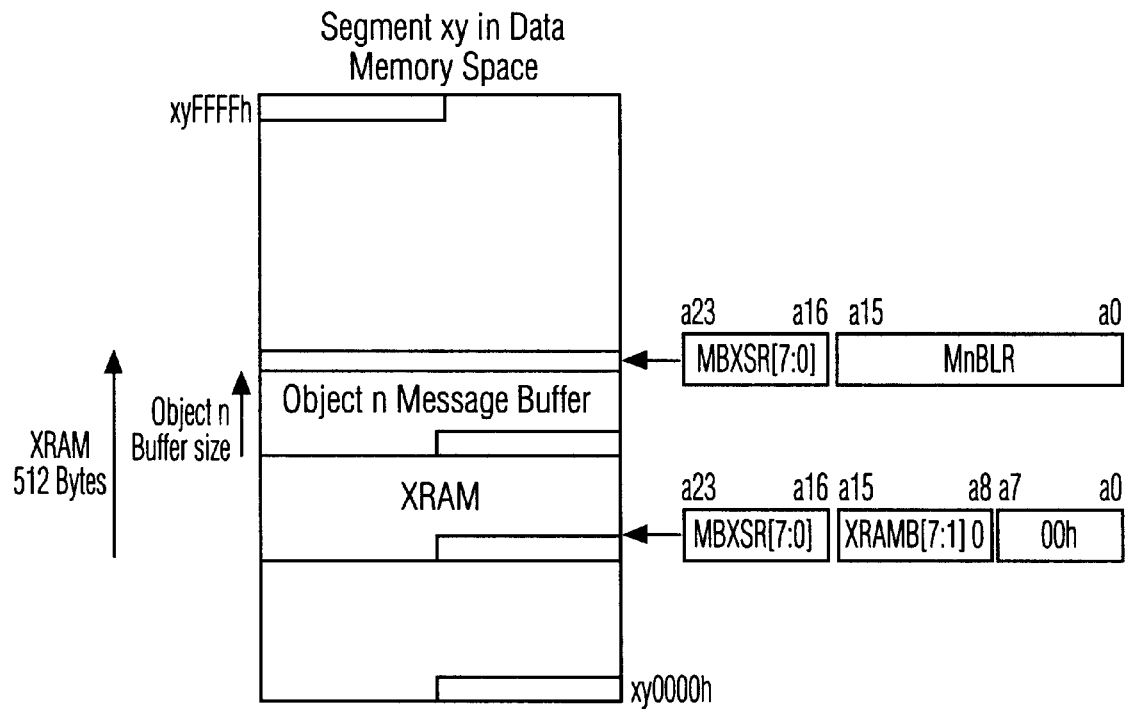
FIG. 8 is a diagram illustrating formation of the base address of the on-chip XRAM of the XA-C3 microcontroller, with an object n message buffer mapped into the on-chip XRAM.

The base address of the XRAM 28 is determined by the contents of the MMRs designated MBXSR and XRAMB, as is shown in FIGS. 7 and 8. As previously mentioned, the 512 Byte XRAM 28 is where some (or all) of the 32 (Rx/Tx) message buffers (corresponding to Message Objects n =0–31) reside. The message buffers can be extended off-chip to a maximum of 8 KBytes. This off-chip expansion capability can accommodate up to thirty-two, 256-Byte message buffers. Since the uppermost 8 bits of all message buffer addresses are formed by the contents of the MBXSR register, the XRAM 28 and all 32 message buffers must reside in the same 64 K Byte data memory segment. Since the XA-C3 microcontroller 20 only provides address lines A0–A19 for accessing external memory, all external memory addresses must be within the lowest 1 MByte of address space. Therefore, if there is external memory in the system into which any of the 32 message buffers will be mapped, then all 32 message buffers and the XRAM 28 must also be mapped entirely into that same 64 K Byte segment, which must be below the 1 MByte address limit.

After the memory space has been mapped, the user can set-up or define up to 32 separate Message Objects, each of which can be either a Transmit (Tx) or a Receive (Rx) Message Object. A Rx Message Object can be associated either with a unique CAN ID, or with a set of CAN IDs which share certain ID bit fields. As previously mentioned, each Message Object has its own reserved block of data memory space (up to 256 Bytes), which is referred to as that Message Object's message buffer. As will be seen, both the size and the base address of each Message Object's message buffer is programmable.

As previously mentioned, each Message Object is associated with a set of eight MMRs 40 dedicated to that Message Object. Some of these registers function differently for Tx Message Objects than they do for Rx Message Objects. These eight MMRs 40 are designated "Message Object Registers" (see FIG. 4).

The names of these eight MMRs 40 are:
1. MnMIDH Message n Match ID High
2. MnMIDL Message n Match ID Low
3. MnMSKH Message n Mask High
4. MnMSKL Message n Mask Low
5. MnCTL Message n Control
6. MNBLR Message n Buffer Location Register
7. MnBSZ Message n Buffer Size
8. MNFCR Message n Fragment Count Register where n ranges from 0 to 31 (i.e., corresponding to 32 independent Message Objects).

In general, the user defines or sets up a Message Object by configuring (programming) some or all of the eight MMRs dedicated to that Message Object, as will be described below. Additionally, as will be described below, the user must configure (program) the global GCTL register, whose bits control global parameters that apply to all Message Objects.

In particular, the user can specify the Match ID value for each Message Object to be compared against the Screener IDs extracted from incoming CAN Frames for Acceptance Filtering. The Match ID value for each Message Object n is specified in the MnMIDH and MnMIDL registers associated with that Message Object n. The user can mask any Screener ID bits which are not intended to be used in Acceptance Filtering, on an object-by-object basis, by writing a logic '1' in the desired (to-be-masked) bit position(s) in the appropriate MnMSKH and/or MNMSKL registers associated with each particular Message Object n. The user is responsible, on set-up, for assigning a unique message buffer location for each Message Object n. In particular, the user can specify the least significant 16 bits of the base address of the message buffer for each particular Message Object n by programming the MnBLR register associated with that Message Object n. The upper 8 bits of the 24-bit address, for all Message Objects, are specified by the contents of the MBXSR register, as previously discussed, so that the message buffers for all Message Objects reside within the same 64 KByte memory segment. The user is also responsible, on set-up, for specifying the size of the message buffer for each Message Object n. In particular, the user can specify the size of the message buffer for each particular Message Object n by programming the MNBSZ register associated with that Message Object n. The top location of the message buffer for each Message Object n is determined by the size of that message buffer as specified in the corresponding MNBSZ register.

The user can configure (program) the MnCTL register associated with each particular Message Object n in order to enable or disable that Message Object n, in order to define or designate that Message Object n as a Tx or Rx Message Object; in order to enable or disable automatic hardware assembly of fragmented Rx messages (i.e., automatic fragmented message handling) for that Message Object n; in order to enable or disable automatic generation of a Message-Complete Interrupt for that Message Object n; and, in order to enable or not enable that Message Object n for Remote Transmit Request (RTR) handling. In CANopen and OSEK systems, the user must also initialize the MnFCR register associated with each Message Object n.

As previously mentioned, on set-up, the user must configure (program) the global GCTL register, whose bits control global parameters that apply to all Message Objects. In particular, the user can configure (program) the GCTL register in order to specify the high-level CAL protocol (if any) being used (e.g., DeviceNet, CANopen, or OSEK); in order to enable or disable automatic acknowledgment of CANopen Frames (CANopen auto-acknowledge); and, in order to specify which of two transmit (Tx) pre-arbitration schemes/policies is to be utilized (i.e., either Tx pre-arbitration based on CAN ID, with the object number being used as a secondary tiebreaker, or Tx pre-arbitration based on object number only).

Receive Message Objects and the Receive Process

During reception (i.e., when an incoming CAN Frame is being received by the XA-C3 microcontroller 20), the CAN/CAL module 77 will store the incoming CAN Frame in a temporary (13-Byte) buffer, and determine whether a complete, error-free CAN frame has been successfully received. If it is determined that a complete, error-free CAN Frame has been successfully received, then the CAN/CAL module 77 will initiate Acceptance Filtering in order to determine whether to accept and store that CAN Frame, or to ignore/discard that CAN Frame.

Acceptance Filtering

In general, because the XA-C3 microcontroller 20 provides the user with the ability to program separate Match ID and Mask fields for each of the 32 independent Message Objects, on an object-by-object basis, as described previously, the Acceptance Filtering process performed by the XA-C3 microcontroller 20 can be characterized as a "match and mask" technique. The basic objective of this Acceptance Filtering process is to determine whether a Screener ID field of the received CAN Frame (excluding the "don't care" bits masked by the Mask field for each Message Object) matches the Match ID of any enabled one of the 32 Message Objects that has been designated a Receive Message Object. If there is a match between the received CAN Frame and more than one Message Object, then the received CAN Frame will be deemed to have matched the Message Object with the lowest object number (n).

Message Storage:

Each incoming (received) CAN Frame that passes Acceptance Filtering, will be automatically stored, via the DMA engine 38, into the message buffer for the Receive Message Object that particular CAN Frame was found to have matched. In an exemplary implementation, the message buffers for all Message Objects are contained in the XRAM 28.

Message Assembly:

In general, the DMA engine 38 will transfer each accepted CAN Frame from the 13-byte pre-buffer to the appropriate message buffer (e.g., in the XRAM 28), one word at a time, starting from the address pointed to by the contents of the MBXSR and MnBLR registers. Every time the DMA engine 38 transfers a byte or a word, it has to request the bus. In this regard, the MIF unit 30 arbitrates between accesses from the XA CPU Core 22 and from the DMA engine 38. In general, bus arbitration is done on an "alternate" policy. After a DMA bus access, the XA CPU Core 22 will be granted bus access, if requested. After an XA CPU bus access, the DMA engine 38 will be granted bus access, if requested. (However, a burst access by the XA CPU Core 22 cannot be interrupted by a DMA bus access).

Once bus access is granted by the MIF unit 30, the DMA engine 38 will write data from the 13-byte pre-buffer to the appropriate message buffer location. The DMA engine 38 will keep requesting the bus, writing message data sequentially to the appropriate message buffer location until the whole accepted CAN Frame is transferred. After the DMA engine 38 has successfully transferred an accepted CAN Frame to the appropriate message buffer location, the contents of the message buffer will depend upon whether the message that the CAN Frame belongs to is a non-fragmented (single frame) message or a fragmented message. Each case is described below:

Non-Fragmented Message Assembly:

For Message Objects that have been set up with automatic fragmented message handling disabled (not enabled—i.e., the FRAG bit in the MnCTL register for that Message Object is set to '0'), the complete CAN ID of the accepted CAN Frame (which is either 11 or 29 bits, depending on whether the accepted CAN Frame is a Standard or Extended CAN Frame) is written into the MnMIDH and MnMIDL registers associated with the Message Object that has been deemed to constitute a match, once the DMA engine 38 has successfully transferred the accepted CAN Frame to the message buffer associated with that Message Object. This will permit the user application to see the exact CAN ID which resulted in the match, even if a portion of the CAN ID was masked for Acceptance Filtering. As a result of this mechanism, the contents of the MnMIDH and MnMIDL registers can change every time an incoming CAN Frame is accepted. Since the incoming CAN Frame must pass through the Acceptance Filter before it can be accepted, only the bits that are masked out will change. Therefore, the criteria for match and mask Acceptance Filtering will not change as a result of the contents of the MnMIDH and MnMIDL registers being changed in response to an accepted incoming CAN Frame being transferred to the appropriate message buffer.

Fragmented Message Assembly:

For Message Objects that have been set up with automatic fragmented message handling enabled (i.e., with the FRAG bit in the MnCTL register for that Message Object set to '1'), masking of the 11/29 bit CAN ID field is disallowed. As such, the CAN ID of the accepted CAN Frame is known unambiguously, and is contained in the MnMIDH and MNMIDL registers associated with the Message Object that has been deemed to constitute a match. Therefore, there is no need to write the CAN ID of the accepted CAN Frame into the MnMIDH and MnMIDL registers associated with the Message Object that has been deemed to constitute a match.

As subsequent CAN Frames of a fragmented message are received, the new data bytes are appended to the end of the previously received and stored data bytes. This process continues until a complete multi-frame message has been received and stored in the appropriate message buffer.

Figure 11:
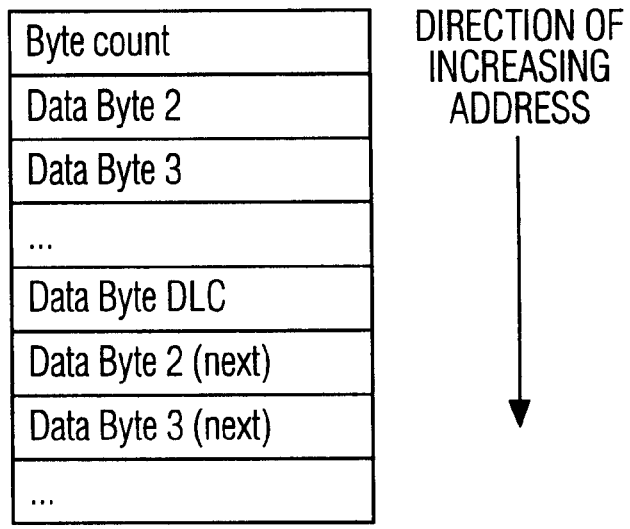
FIG. 11 is a diagram illustrating the message storage format for fragmented CAL messages; and, FIG. 12 is a diagram illustrating the message storage format for fragmented CAN messages.

Under CAL protocols DeviceNet, CANopen, and OSEK, if a Message Object is an enabled Receive Message Object, and its associated MnCTL register has its FRAG bit set to '1' (i.e., automatic fragmented message assembly is enabled for that particular Receive Message Object), then the first data byte (Data Byte 1) of each received CAN Frame that matches that particular Receive Message Object will be used to encode fragmentation information only, and thus, will not be stored in the message buffer for that particular Receive Message Object. Thus, message storage for such "FRAG-enabled" Receive Message Objects will start with the second data byte (Data Byte 2) and proceed in the previously-described manner until a complete multi-frame message has been received and stored in the appropriate message buffer. This message storage format is illustrated in FIG. 11. The message handler hardware will use the fragmentation information contained in Data Byte 1 of each CAN Frame to facilitate this process.

Figure 12:
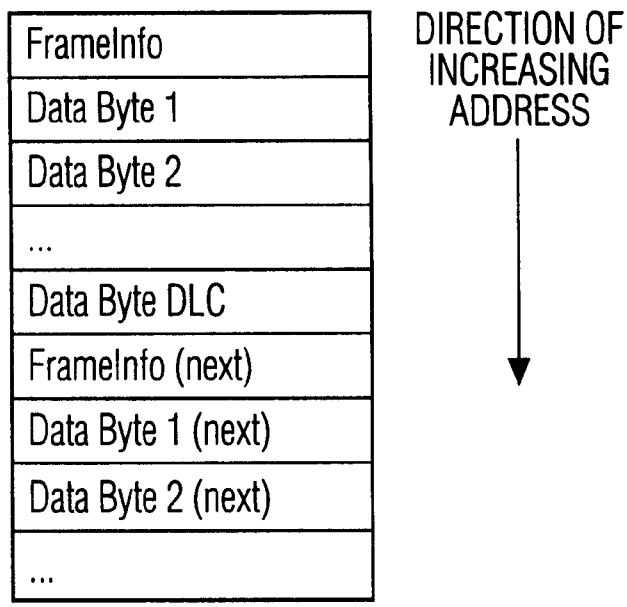

Under the CAN protocol, if a Message Object is an enabled Receive Message Object, and its associated MnCTL register has its FRAG bit set to '1' (i.e., automatic fragmented message assembly is enabled for that particular Receive Message Object), then the CAN Frames that match that particular Receive Message Object will be stored sequentially in the message buffer for that particular Receive Message Object using the format shown in FIG. 12.

When writing message data into a message buffer associated with a Message Object n, the DMA engine 38 will generate addresses automatically starting from the base address of that message buffer (as specified in the MnBLR register associated with that Message Object n). Since the size of that message buffer is specified in the MnBSZ register associated with that Message Object n, the DMA engine 38 can determine when it has reached the top location of that message buffer. If the DMA engine 38 determines that it has reached the top location of that message buffer, and that the message being written into that message buffer has not been completely transferred yet, the DMA engine 38 will wrap around by generating addresses starting from the base address of that message buffer again. Some time before this happens, a warning interrupt will be generated so that the user application can take the necessary action to prevent data loss.

The message handler will keep track of the current address location of the message buffer being written to by the DMA engine 38, and the number of bytes of each CAL message as it is being assembled in the designated message buffer. After an "End of Message" for a CAL message is decoded, the message handler will finish moving the complete CAL message and the Byte Count into the designated message buffer via the DMA engine 38, and then generate an interrupt to the XA CPU Core 22 indicating that a complete message has been received.

Since Data Byte 1 of each CAN Frame contains the fragmentation information, it will never be stored in the designated message buffer for that CAN Frame. Thus, up to seven data bytes of each CAN Frame will be stored. After the entire message has been stored, the designated message buffer will contain all of the actual informational data bytes received (exclusive of fragmentation information bytes) plus the Byte Count at location 00 which will contain the total number of informational data bytes stored.

It is noted that there are several specific user set-up/programming procedures that must be followed when invoking automatic hardware assembly of fragmented OSEK and CANopen messages. These and other particulars can be found in the XA-C3 CAN Transport Layer Controller User Manual that is part of the parent Provisional Application Serial No. 60/154,022, the disclosure of which has been fully incorporated herein for all purposes.

Transmit Message Objects and the Transmit Process

In order to transmit a message, the XA application program must first assemble the complete message and store it in the designated message buffer for the appropriate Transmit Message Object n. The message header (CAN ID and Frame Information) must be written into the MnMIDH, MnMIDL, and MnMSKH registers associated with that Transmit Message Object n. After these steps are completed, the XA application is ready to transmit the message. To initiate a transmission, the object enable bit (OBJ_EN bit) of the MnCTL register associated with that Transmit Message Object n must be set, except when transmitting an Auto-Acknowledge Frame in CANopen. This will allow this ready-to-transmit message to participate in the prearbitration process. In this connection, if more than one message is ready to be transmitted (i.e., if more than one Transmit Message Object is enabled), a Tx Pre-Arbitration process will be performed to determine which enabled Transmit Message Object will be selected for transmission. There are two Tx Pre-Arbitration policies which the user can choose between by setting or clearing the Pre_Arb bit in the GCTL register.

After a Tx Message Complete interrupt is generated in response to a determination being made by the message handler that a completed message has been successfully transmitted, the Tx Pre-Arbitration process is "reset", and begins again. Also, if the "winning" Transmit Message Object subsequently loses arbitration on the CAN bus, the Tx Pre-Arbitration process gets reset and begins again. If there is only one Transmit Message Object whose OBJ_EN bit is set, it will be selected regardless of the Tx Pre-Arbitration policy selected.

Once an enabled Transmit Message Object has been selected for transmission, the DMA engine 38 will begin retrieving the transmit message data from the message buffer associated with that Transmit Message Object, and will begin transferring the retrieved transmit message data to the CCB 42 for transmission. The same DMA engine and address pointer logic is used for message retrieval of transmit messages as is used for message storage of receive messages, as described previously. Further, message buffer location and size information is specified in the same way, as described previously. In short, when a transmit message is retrieved, it will be written by the DMA engine 38 to the CCB 42 sequentially. During this process, the DMA engine 38 will keep requesting the bus; when bus access is granted, the DMA engine 38 will sequentially read the transmit message data from the location in the message buffer currently pointed to by the address pointer logic; and, the DMA engine 38 will sequentially write the retrieved transmit message data to the CCB 42. It is noted that when preparing a message for transmission, the user application must not include the CAN ID and Frame Information fields in the transmit message data written into the designated message buffer, since the Transmit (Tx) logic will retrieve this information directly from the appropriate MnMIDH, MnMIDL, and MnMSKH registers.

The XA-C3 microcontroller 20 does not handle the transmission of fragmented messages in hardware. It is the user's responsibility to write each CAN Frame of a fragmented message to the appropriate message buffer, enable the associated Transmit Message Object for transmission, and wait for a completion before writing the next CAN Frame of that fragmented message to the appropriate message buffer. The user application must therefore transmit multiple CAN Frames one at a time until the whole multi-frame, fragmented transmit message is successfully transmitted. However, by using multiple Transmit Message Objects whose object numbers increase sequentially, and whose CAN IDs have been configured identically, several CAN Frames of a fragmented transmit message can be queued up and enabled, and then transmitted in order.

To avoid data corruption when transmitting messages, there are three possible approaches:

1. If the Tx Message Complete interrupt is enabled for the transmit message, the user application would write the next transmit message to the designated transmit message buffer upon receipt of the Tx Message Complete interrupt. Once the interrupt flag is set, it is known for certain that the pending transmit message has already been transmitted.
2. Wait until the OBJ_EN bit of the MnCTL register of the associated Transmit Message Object clears before writing to the associated transmit message buffer. This can be accomplished by polling the OBJ_EN bit of the MnCTL register of the associated Transmit Message Object.
3. Clear the OBJ_EN bit of the MnCTL register of the associated Transmit Message Object while that Transmit Message Object is still in Tx Pre-Arbitration.

In the first two cases above, the pending transmit message will be transmitted completely before the next transmit message gets transmitted. For the third case above, the transmit message will not be transmitted. Instead, a transmit message with new content will enter Tx PreArbitration.

There is an additional mechanism that prevents corruption of a message that is being transmitted. In particular, if a transmission is ongoing for a Transmit Message Object, the user will be prevented from clearing the OBJ_EN bit in the MnCTL register associated with that particular Transmit Message Object.

CAN/CAL RELATED INTERRUPTS

The CAN/CAL module 77 of the XA-C3 microcontroller 20 is presently configured to generate the following five different Event interrupts to the XA CPU Core 22:
1. Rx Message Complete
2. Tx Message Complete
3. Rx Buffer Full
4. Message Error
5. Frame Error For single-frame messages, the "Message Complete" condition occurs at the end of the single frame. For multi-frame (fragmented) messages, the "Message Complete" condition occurs after the last frame is received and stored. Since the XA-C3 microcontroller 20 hardware does not recognize or handle fragmentation for transmit messages, the Tx Message Complete condition will always be generated at the end of each successfully transmitted frame.

As previously mentioned, there is a control bit associated with each Message Object indicating whether a Message Complete condition should generate an interrupt, or just set a "Message Complete Status Flag" (for polling) without generating an interrupt. This is the INT_EN bit in the MnCTL register associated with each Message Object n.

There are two 16-bit MMRs 40, MCPLH and MCPLL, which contain the Message Complete Status Flags for all 32 Message Objects. When a Message Complete (Tx or Rx) condition is detected for a particular Message Object, the corresponding bit in the MCPLH or MCPLL register will be set. This will occur regardless of whether the INT_EN bit is set for that particular Message Object (in its associated MnCTL register), or whether Message Complete Status Flags have already been set for any other Message Objects.

In addition to these 32 Message Complete Status Flags, there is a Tx Message Complete Interrupt Flag and an Rx Message Complete Interrupt Flag, corresponding to bits [1] and [0], respectively, of an MMR 40 designated CANINTFLG, which will generate the actual Event interrupt requests to the XA CPU Core 22. When an End-of-Message condition occurs, at the same moment that the Message Complete Status Flag is set, the appropriate Tx or Rx Message Complete Interrupt flip-flop will be set provided that INT_EN=1 for the associated Message Object, and provided that the interrupt is not already set and pending.

Further details regarding the generation of interrupts and the associated registers can be found in the XA-C3 Functional Specification and in the XA-C3 CAN Transport Layer Controller User Manual, both of which are part of the parent Provisional Application Serial No. 60/154,022, the disclosure of which has been fully incorporated herein for all purposes.

MESSAGE BUFFERS

As was previously described in detail hereinabove, the XA-C3 microcontroller 20 supports up to 32 separate and independent Message Objects, each of which is set-up or defined by virtue of the user (programmer) configuring (programming) some or all of the eight MMRs 40 dedicated to that Message Object. In the XA-C3 microcontroller 20, each of the 32 Message Objects is assigned its own block of address space in data memory, which serves as its message buffer for data storage. The size and location of each message buffer is programmable, and thus, reconfigurable "on the fly" by the user/programmer. The message buffers can be positioned in any desired location within the overall data memory space addressable by the XA-C3 microcontroller 20, which is presently configured to be a 16 Mbyte overall memory space. These message buffers can be located in the XRAM 28 and/or in any off-chip portion of the overall data memory space.

The location of the message buffer associated with each Message Object n is established by programming the MMR 40 designated MnBLR associated with that Message Object, i.e., by programming the Message n Buffer Location Register. The size of the message buffer associated with each Message Object is established by programming the MMR 40 designated MnBSZ associated with that Message Object, i.e., by programming the Message n Buffer SiZe Register. In the XA-C3 microcontroller 20, allowable buffer sizes are 2, 4, 8, 16, 32, 64, 128, or 256 bytes. Users can select the size of each message buffer based on the anticipated length of the incoming message, or they can conserve memory by deliberately specifying smaller buffers at the expense of increased processor intervention to handle more frequent buffer-full conditions. In the XA-C3 microcontroller 20, Direct Memory Access (DMA) (i.e., the DMA engine 38) is used to enable the XA-C3 CAN/CAL module 77 to directly access the 32 message buffers without interrupting the XA-C3 processor (CPU) core 22.

The XA-C3 CAN/CAL module 77 uses the values programmed into the buffer size registers MnBSZ to reserve the designated number of bytes of storage for each Message Object n. For Receive Message Objects, this field is also used by logic in the XA-C3 CAN/CAL module 77 to calculate the total number of bytes that have actually been stored in the message buffers, and to identify when a buffer-full condition is reached. Each time a byte of data is stored in a message buffer associated with a Message Object n, the XA-C3 CAN/CAL module 77 concurrently accesses the MnBSZ and MnBLR registers associated with that Message Object. Logic incorporated within the XA-C3 CAN/CAL module 77 decodes the buffer size for that Message Object and compares the decoded buffer size to the address pointer to determine current byte count and available space left in that Message Object's message buffer.

The present implementation of the XA-C3 microcontroller 20 requires that all of the 32 message buffers reside within the same 64 Kbyte memory segment (or "page"). The user may position the message buffers within any of the 256 pages in the overall XA-C3 data memory space (i.e., 256×64 Kbytes=16 Mbytes). Programming the locations of the message buffers is accomplished in two steps.

The first step is to program the page number in which all of the message buffers reside into the MMR 40 designated as the MBXSR register, which is one of the CCB Registers depicted in FIG. 4. As was previously described, the contents of this register are subsequently used as the eight MSBs of address for all DMA accesses to any of the message buffers. This register also establishes the memory page in which the XRAM 28 resides.

The second step is to program the base address (16 bits) for each individual message buffer into the MnBLR associated with that message buffer. These 16-bit address values initially specified by the user/programmer constitute the base addresses of the 32 respective message buffers within the 64 Kbyte memory page specified in the MBXSR register for all message buffers. It should be noted that the message buffers can be placed apart from one another, as there is no requirement that the message buffer space be continuous (i.e., that the message buffers reside in physically contiguous locations within the data memory space). Further, it should also be noted that some or all of the message buffers can be placed in off-chip memory, and others in the on-chip XRAM 28. In the XA-C3 microcontroller 20, it is required that each message buffer start at a binary boundary for its size (i.e., the 8 LSBs must be zero for a 256-byte message buffer, the 7 LSBs must be zero for a 128-byte message buffer, etc.).

DMA access to each of the message buffers is achieved by using the 8 bits stored in the MBXSR register as the 8 MSBs of the address of that message buffer, and the 16 bits stored in the MnBLR register for that message buffer as the 16 LSBs of the address of that message buffer. The base address initially programmed by the user into the MnBLR register for that message buffer is the address of the first (bottom) location of that message buffer. When the first frame of a new receive message arrives, the CAN/CAL module 77 hardware writes a semaphore code into this bottom location before beginning to store actual data bytes, starting at the next location in that message buffer. At the end of the new receive message (or when a buffer-full condition is detected), the CAN/CAL module 77 hardware computes the total number of bytes actually stored in that message buffer, and writes this value into the bottom location of that message buffer. The processor (i.e., the XA CPU Core 22) can then read this value and determine precisely how many additional bytes must be read and processed.

Each time a new byte of data must be written to (for receive messages) or retrieve from (for transmit messages) a message buffer, the DMA engine 38 reads the MnBLR register for that message buffer in order to retrieve the current address pointer for the associated Message Object. The DMA engine 38 concatenates the 8 MSBs stored in the global Message Buffer Segment Register (i.e., the MBXSR register) and the 16 LSBs stored in the MnBLR register for that message buffer to form a complete 24-bit message buffer address. The DMA engine 38 then passes this address to the Memory Interface (MIF) unit 30, along with a flag indicating that the DMA engine 38 requires access to the memory. As soon as the current set of XA-C3 processor memory accesses are completed, the MIF unit 30 will initiate a memory read or write to the address provided by the DMA engine 38, and then permit the DMA engine 38 to perform the required data transfer to/from the desired message buffer. DMA accesses are typically done two bytes at a time (i.e., as a 16-bit operation). However, 8-bit operations are employed when there is only a single byte to be transferred.

As soon as the requested DMA operation is completed, the DMA engine 38 increments the 16-bit address value stored in the MnBLR register associated with that message buffer (by one or two, depending upon whether a one byte or two byte access was performed), and writes this value back into the MnBLR register for that message buffer. Thus, the MnBLR registers, along with the associated increment logic within the DMA engine 38, effectively function as a set of 32 binary "counters". Thus, at any given time, each MnBLR register contains the address which will be used for the next data access to the message buffer associated with the Message Object n. In this manner, the MnBLR register for each message buffer serves as an address-pointer. These address-pointer fields are also readable at any time by the processor under software control.

The above-described approach to message storage also provides an extremely quick and efficient means of freeing up a message buffer when a message completes or when a message buffer is full. The software can respond to a message-complete interrupt or a buffer-full interrupt by simply repositioning the message-buffer space for that particular Message Object to somewhere else in the message buffer memory space. This is accomplished by performing a single write operation to modify the buffer base-address specified in the appropriate MnBLR register (i.e., "address-pointer"). This is essentially the extent of a very short interrupt handling routine. These interrupts must be handled quickly because the message buffer must be freed-up for subsequent message reception. Interrupt response is particularly critical if many completed messages are stacked up and need to be dealt with at once. Once this buffer repositioning is accomplished, the hardware is immediately ready to receive a new message over that Message Object "channel" (or, the continuation of the current message, in the case of a buffer-full interrupt). The memory space that was previously designated as the message buffer for that Message Object n still contains the previously-received message data, but this space now becomes just part of the long-term data memory space. The message information stored in this long-term data memory space can then be processed by the software at its leisure.

This same buffer repositioning technique can be employed for Transmit Messages to facilitate fragmentation. Unlike the receive case, the XA-C3 CAN/CAL Module 77 does not automatically assemble fragmented outgoing messages. It is incumbent upon the software to "load" a new message frame each time the previous frame is transmitted. Using the XA-C3microcontroller 20 message storage scheme, however, the software can construct an entire fragmented message prior to enabling transmission. As each frame is transmitted, the processor (XA CPU Core 22) only needs to reposition the buffer (again, using a single write operation) to point to the location of the next frame. This is much faster than competing devices, which require the processor to move up to 13 bytes of data from memory to a dedicated transmit buffer.

It will be appreciated that with the above-described message buffer scheme of the present invention, each message buffer can be regarded as a separate FIFO having an independently programmable buffer length, which provides a revolutionary approach to storing sequential messages of varying lengths without any CPU intervention.

THE PRESENT INVENTION

As described hereinabove, each incoming (received) CAN Frame that passes Acceptance Filtering will be automatically stored, via the DMA engine 38, into the message buffer for the Receive Message Object that particular CAN Frame was found to have matched, without interrupting the XA CPU Core 22. Under the CAN protocol, if a Message Object is an enabled Receive Message Object, and its associated MnCTL register has its FRAG bit set to '1' (i.e., automatic fragmented message assembly is enabled for that particular Receive Message Object), then the CAN Frames that match that particular Receive Message Object will be stored sequentially in the message buffer for that particular Receive Message Object using the format shown in FIG. 12.

When writing message data into a message buffer associated with a Message Object n, the DMA engine 38 will generate addresses automatically starting from the base address of that message buffer (as specified in the MNBLR register associated with that Message Object n). Since the size of that message buffer is specified in the MnBSZ register associated with that Message Object n, the DMA engine 38 can determine when it has reached the top location of that message buffer.

There is no guarantee that an incoming message will not contain more data bytes than can be held by the designated message buffer, i.e., there is no guarantee that the programmed buffer size specified in the MnBLR register will be sufficient to hold all frames of the incoming message. This will always be the case for messages which exceed the maximum buffer size, which in the case of the current version of the XA-C3 microcontroller 20 is 256 bytes. This buffer-full condition can also occur in cases where the length of the expected message can not be predicted in advance of its receipt. The user may also elect to conserve memory resources by deliberately specifying smaller buffer sizes at the expense of increased processor intervention to handle more frequent buffer-full conditions.

As previously stated, the XA-C3 microcontroller 20 is designed to handle a message buffer full condition in such a manner that ensures no loss of data, while minimizing the required processor intervention, utilizing the following scheme.

The first requirement for message buffer full handling is that there be no loss of message data. Waiting until the designated message buffer actually fills up before interrupting the processor core (i.e., the XA CPU Core 22) is too late to ensure no loss of data. The DMA operation can not be halted while the processor core 22 responds to a buffer-full interrupt. All data bytes in the currently received frame must be transferred quickly in order to allow the XA-C3 CAN/CAL module 77 to handle the following incoming message.

In accordance with the present invention, as implemented in the XA-C3 microcontroller 20, this problem is solved (i.e., this first requirement is met) by defining a message buffer full condition as follows: if, after a complete frame is received and stored, there are less than seven bytes remaining in the designated message buffer, and additional frames are expected for that message, the designated message buffer is considered to be full, and Rx Buffer-Full Interrupt is generated. If no additional frames are expected for that message, an Rx Message-Complete Interrupt is generated instead.

The rationale for this approach is that since a message frame can contain up to seven data bytes, there is the potential for the next frame to overflow the message buffer if less than seven byte of storage remain available for message data storage. The processor core 22 must intervene at this point to ensure that a buffer overflow does not actually occur. The specific mechanism employed by the XA-C3 microcontroller 20 to accomplish this scheme will now be described.

More particularly, when a message frame is received by the XA-C3 CAN/CAL module 77 and passes one of the input acceptance filters, it is passed onto the DMA engine 38. DMA access to each of the message buffers is achieved by using the 8 bits stored in the MBXSR register as the 8 MSBs of the address of that message buffer, and the 16 bits stored in the MnBLR register for that message buffer as the 16 LSBs of the address of that message buffer. The base address initially programmed by the user into the MNBLR register for that message buffer is the address of the first (bottom) location of that message buffer. When the first frame of a new receive message arrives, the CAN/CAL module 77 hardware writes a semaphore code into this bottom location before beginning to store actual data bytes, starting at the next location in that message buffer. At the end of the new receive message (or when a buffer-full condition is detected), the CAN/CAL module 77 hardware computes the total number of bytes actually stored in that message buffer, and writes this value into the bottom location of that message buffer. The processor (i.e., the XA CPU Core 22) can then read this value and determine precisely how many additional bytes must be read and processed.

As soon as the requested DMA operation is completed, the DMA engine 38 increments the 16-bit address value stored in the MnBLR register associated with that message buffer (by one or two, depending upon whether a one byte or two byte access was performed), and writes this value back into the MnBLR register for that message buffer. Thus, the MnBLR registers, along with the associated increment logic within the DMA engine 38, effectively function as a set of 32 binary "counters". Thus, at any given time, each MnBLR register contains the address which will be used for the next data access to the message buffer associated with the Message Object n. In this manner, the MnBLR register for each message buffer serves as an address-pointer. These address-pointer fields are also readable at any time by the processor under software control.

Each time a byte of data is stored in a message buffer associated with a Message Object n, the XA-C3 CAN/CAL module 77 concurrently accesses the MNBSZ and MnBLR registers associated with that Message Object. Logic incorporated within the XA-C3 CAN/CAL module 77 decodes the buffer size for that Message Object and compares the decoded buffer size (the value in the associated MnBSZ register) to the address pointer (i.e., the current address value in the associated MnBLR register) to determine current byte count and available space left in that. Message Object's message buffer.

After the last byte of each frame of the incoming message has been written into the designated message buffer for that message, logic within the CAN/CAL module 77 checks to determine whether or not this is the final frame of the incoming message. This information is derived from an encoded field contained in the header portion of the incoming message that is transmitted as part of the frame, and stored in a flip-flop. If the received frame is not the final frame of the incoming message, then a check must be made for a buffer-full condition (as defined above). This is accomplished by logic within the CAN/CAL module 77 determining the number of bytes that remain available for message data storage in the designated message buffer, by subtracting the LSBs of the current address pointer (i.e., the current address value in the MnBLR register) from the buffer-size value (i.e., the value in the MnBSZ register), and comparing the result to "7". If seven bytes or more remain available for message data storage in the designated message buffer, then there is definitely sufficient space to store at least one more frame, so no buffer-full condition exists. If less than seven bytes remain available for message data storage in the designated message buffer, then a buffer-full condition is declared.

In response to a buffer-full condition, logic in the XA-C3 CAN/CAL module 77 performs the following steps:

1. The current byte count is derived from the contents of the MnBLR and MnBSZ registers;
2. The address pointer for the associated Message Object n is reset to the bottom ("0") location of the designated message buffer, i.e., the current value of the MnBLR register associated with that message buffer is replaced with the base address initially programmed by the user into the MnBLR register associated with that message buffer;
3. The current byte count is written into the "0" location (i.e., base address) of the designated message buffer, and then the address pointer (the value in the MnBLR register) is incremented to the next buffer address. The data bytes of the next frame of the incoming message will be written into the designated message buffer starting at this location; and,
4. An Rx Buffer-Full Interrupt is generated.

The XA CPU Core 22 now has a sufficient period of time (i.e., at least the time required for another complete frame to be transmitted across the CAN bus) to take action to free up the message buffer. With the XA-C3 microcontroller 20, the software is provided with two options as to how to respond to this Rx Buffer-Full Interrupt, namely:

1. Read the entire contents of the message buffer and move them to elsewhere in the data memory, thereby freeing up memory space for the remaining frames of the incoming message; or,
2. Reposition the message buffer for the associated Message Object by modifying its base address in the associated MnBLR register.

If option 1 is selected, the software will read and retrieve the current byte count from the bottom location of the designated message buffer. Subsequent data bytes of the incoming message will be written into the designated message buffer at buffer location "1". Once an End-of-Message condition (or another buffer-full condition) occurs, the new byte count (reflecting any additional bytes received and stored) will be written into buffer location "0" and a new interrupt to the processor core 22 will be generated. At that point, the software can read those remaining data bytes.

If option 2 is selected, the data bytes already received will remain where they are, i.e., in the first portion of memory previously designated for that message buffer (hereinafter referred to as the "first buffer portion"). Subsequent data bytes of the incoming message will be written into the new message buffer memory space pointed to by the new base address in the associated MnBLR register (hereinafter referred to as the "second buffer portion"). The processor core 22 can wait until the entire message is completed (i.e., until after the final frame is received and stored), and then retrieve and process the entire message at once. In this case, the bottom location of the first buffer portion will identify the number of data bytes stored therein, and the bottom location of the second buffer portion will identify the number of data bytes stored therein. This mechanism makes it extremely easy for the processor to assemble the entire message. It will be appreciated by those skilled in the pertinent art that option 2 can be implemented using very few instructions, thereby resulting in a much more efficient interrupt service routine.

Although the present invention has been described in detail hereinabove in the context of a specific preferred embodiment/implementation, it should be clearly understood that many variations, modifications, and/or alternative embodiments/implementations of the basic inventive concepts taught herein which may appear to those skilled in the pertinent art will still fall within the spirit and scope of the present invention, as defined in the appended claims.

What is claimed is:

1. A CAN microcontroller that supports a plurality of message objects, comprising:

a processor core that runs CAN applications;

a plurality of message buffers associated with respective ones of the message objects;

a CAN/CAL module that processes incoming messages that include a plurality of frames, each frame having a maximum number n of data bytes;

a plurality of message object registers associated with each of the message objects, including:
at least one buffer size register that contains a message buffer size value that specifies the size of the message buffer associated with that message object; and,
at least one buffer location register that contains an address pointer that points to an address of the storage location in the message buffer associated with that message object where the next data byte of the current incoming message is to be stored;

wherein the CAN/CAL module includes:
a message handling function that transfers successive frames of the current incoming message to the message buffer associated with a selected one of the message objects designated as a receive message object for the current incoming message;
a frame status detection function that detects whether or not the current frame of the current incoming message is the final frame of the current incoming message; and,
a buffer-full detection function that, in response to a detection that the current frame of the current incoming message is not the final frame of the current incoming message:
determines the number of available bytes of remaining storage capacity in the message buffer associated with the designated receive message object for the current incoming message; and,
declares a message buffer-full condition if the determined number of available bytes is less than the maximum number n of data bytes.

2. The CAN microcontroller as set forth in claim 1, wherein the CAN/CAL module further includes a message buffer-full interrupt generator function that generates a message buffer-full interrupt to the processor core in response to a declaration of a message buffer-full condition.

3. The CAN microcontroller as set forth in claim 1, wherein the buffer-full detection function determines the number of available bytes of remaining storage capacity in the message buffer associated with the designated receive message object for the current incoming message by subtracting prescribed bits of the address pointer contained in the at least one buffer location register associated with the designated receive message object for the current incoming message, from the message buffer size value contained in the at least one buffer size register associated with the designated receive message object for the current incoming message.

4. The CAN microcontroller as set forth in claim 1, wherein each frame of each incoming, multi-frame message includes a header portion that indicates whether that frame is the last frame in its message.

5. The CAN microcontroller as set forth in claim 4, wherein the frame status detection function detects whether the current frame of the current incoming message is the final frame of the current incoming message by deriving that information from the header portion of the current frame of the current incoming message.

6. The CAN microcontroller as set forth in claim 1, wherein the CAN/CAL module further includes a message-complete interrupt generator function that generates a message-complete interrupt to the processor core in response to the frame status detection function detecting that the current frame of the current incoming message is the final frame of the current incoming message.

7. The CAN microcontroller as set forth in claim 1, wherein the CAN/CAL module further includes an address pointer increment function that, in response to a transfer of the current data byte to the message buffer associated with the designated receive message object for the current incoming message, automatically increments the address pointer to the address of the storage location in that message buffer where the next data byte of the current incoming message is to be stored.

8. The CAN microcontroller as set forth in claim 1, wherein the size of each message buffer is programmable by means of programming a selected message buffer size value into the at least one message buffer size register associated with that message buffer.

9. The CAN microcontroller as set forth in claim 1, wherein a base address of each message buffer is programmable by means of programming the address pointer associated with that message buffer to point to a selected base address.

10. The CAN microcontroller as set forth in claim 1, further comprising a DMA engine that implements the message handling function without interrupting the processor core.

11. The CAN microcontroller as set forth in claim 1, further comprising means for selectively enabling each message object as a transmit or receive message object.

12. The CAN microcontroller as set forth in claim 11, wherein:

the CAN/CAL module further includes an acceptance filtering function that performs acceptance filtering on each incoming message by comparing a screener field of the incoming message with an acceptance filter field associated with each receive-enabled message object;

the current incoming message is accepted if its screener field matches the acceptance field of a receive-enabled message object; and, the matching receive-enabled message object comprises the designated receive message object.

13. The CAN microcontroller as set forth in claim 9, wherein the CAN/CAL module further includes a buffer-full handling function that, in response to a declaration of a message buffer-full condition:

determines a current byte count that indicates the number of data bytes of the current incoming message that have already been stored in the message buffer associated with the designated receive message object at the time the message buffer-full condition is declared;

resets the address pointer contained in the at least one buffer location register associated with the designated receive message object to the base address;

writes the current byte count into the message buffer associated with the designated receive message object, in the storage location corresponding to the base address; and, generates a message buffer-full interrupt.

14. The CAN microcontroller as set forth in claim 13, further comprising a data memory space, wherein the message buffers are located in the data memory space.

15. The CAN microcontroller as set forth in claim 14, wherein a current CAN application running on the processor core, in response to the message buffer-full interrupt, reads the entire contents of the designated receive message buffer, and then transfers the read-out entire contents to another storage location in the data memory space, thereby freeing up the designated receive message buffer to store the at least one remaining frame of the current incoming message.

16. The CAN microcontroller as set forth in claim 14, wherein a current CAN application running on the processor core, in response to the message buffer-full interrupt, removes the currently-stored data bytes of the current incoming message from the designated receive message buffer, thereby freeing up the designated receive message buffer to store the at least one remaining frame of the current incoming message.

17. The CAN microcontroller as set forth in claim 14, wherein a current CAN application running on the processor core, in response to the message buffer-full interrupt:

removes the currently-stored data bytes of the current incoming message from the designated receive message buffer, thereby freeing up the designated receive message buffer to store the at least one remaining frame of the current incoming message; and, relocates the removed data bytes to a different portion of the data memory space.

18. The CAN microcontroller as set forth in claim 13, wherein a current CAN application running on the processor core, in response to the message buffer-full interrupt, modifies the base address of the designated receive message buffer by replacing the current base address with a new base address, wherein the designated receive message buffer is comprised of a first buffer portion starting with the current base address, and a second buffer portion starting with the new base address.

19. The CAN microcontroller as set forth in claim 18, wherein the CAN/CAL module further includes a message-complete interrupt generator function that generates a message-complete interrupt to the processor core in response to the frame status detection function detecting that the current frame of the current incoming message is the final frame of the current incoming message.

20. The CAN microcontroller as set forth in claim 19, wherein the current CAN application running on the processor core, in response to the message-complete interrupt:

retrieves a first number of the data bytes of the current incoming message from the first buffer portion; and, retrieves a second number of the data bytes of the current incoming message from the second buffer portion.

21. The CAN microcontroller as set forth in claim 20, wherein the first number comprises the current byte count.

* * * * *